United States Patent

Sueyoshi et al.

[11] Patent Number: 5,156,343
[45] Date of Patent: Oct. 20, 1992

[54] PROCESS FOR PREPARING POLYTETRAFLUOROETHYLENE GRANULAR POWDER

[75] Inventors: Tatsuo Sueyoshi, Settu; Singo Tanigawa; Toshio Nakashima, both of Ibaraki, all of Japan

[73] Assignee: Daikin Industries, Ltd., Osaka, Japan

[21] Appl. No.: 665,867

[22] Filed: Mar. 7, 1991

[30] Foreign Application Priority Data

Mar. 8, 1990 [JP] Japan .................. 2-59297

[51] Int. Cl.$^5$ .............................................. B02C 19/00
[52] U.S. Cl. ........................................... 241/3; 241/21; 264/118; 264/127
[58] Field of Search ............. 241/101 B, 46.17, 21, 241/172, 3, 101.8; 264/117, 118, 127

[56] References Cited

U.S. PATENT DOCUMENTS

| | | | |
|---|---|---|---|
| 3,674,762 | 7/1972 | Izumo et al. | 264/5 |
| 3,726,483 | 4/1973 | Kometani et al. | 241/5 |
| 3,781,258 | 12/1973 | Kometani et al. | |
| 3,882,217 | 5/1975 | Banham et al. | 264/117 |
| 3,983,200 | 9/1976 | Browning | 264/117 |
| 4,118,235 | 10/1978 | Horiuchi et al. | 264/338 X |
| 4,143,110 | 3/1979 | Morozumi et al. | 264/117 |
| 4,241,137 | 12/1980 | Izumo et al. | |
| 4,308,063 | 12/1981 | Horiuchi et al. | 264/338 X |

Primary Examiner—Timothy V. Eley
Assistant Examiner—Frances Chin
Attorney, Agent, or Firm—Armstrong & Kubovcik

[57] ABSTRACT

A process for preparing a polytetrafluoroethylene granular powder which comprises agitating primary particles of a finely divided polytetrafluoroethylene powder having an average particle size of not more than 100 μm in an aqueous medium containing no organic liquid to form agglomerates while crushing an agglomerated powder in an apparatus having an agitating mechanism of the aqueous medium and a crushing mechanism of the agglomerates within a temperature range between not less than 20° C. and less than 60° C. According to the present invention, the dense polytetrafluoroethylene granular powder having the excellent electric properties and the high bulk density can be obtained without using the organic liquid which is expensive and whose use is restricted.

4 Claims, 1 Drawing Sheet

PROCESS FOR PREPARING POLYTETRAFLUOROETHYLENE GRANULAR POWDER

BACKGROUND OF THE INVENTION

The present invention relates to a process for preparing polytetrafluoroethylene granular powder, more particularly to a process for preparing a polytetrafluoroethylene granular powder suitable for use in compression molding.

Polytetrafluoroethylene powder which is prepared by polymerizing tetrafluoroethylene in an aqueous medium in the substantially absence of an emulsifier is molded by compression molding which is similar to methods adopted in a field of powder metallurgy, differing from molding methods to which other thermoplastic resins are applied such as melt-molding, melt injection molding and hot compression molding. Therefore, the polytetrafluoroethylene granular powder for molding is required to have some specific properties. As the fundamental properties, it is required to have excellent flowability, to be soft and to be pressed by a comparative low pressure to form a dense preformed article, and to have a large bulk density.

As a process for preparing a polytetrafluoroethylene granular powder satisfying the above-mentioned requirements, there has hitherto been known a process wherein the polytetrafluoroethylene powder is agitated in an aqueous medium containing an organic liquid to granulate (Japanese Examined Patent Publication No. 44-22619).

Further, the above-mentioned process has been improved, and Japanese Examined Patent Publication No. 57-15128 has proposed a process for preparing a polytetrafluoroethylene granular powder having a uniformer particle size distribution and having better flowability and the process has been widely carried out. Japanese Examined Patent Publication No. 57-15128 discloses a process for agglomerating a polytetrafluoroethylene powder by agitating the same in an aqueous medium containing an organic liquid having a surface tension of not more than 35 dynes/cm wherein the agitation is carried out while the crushing of the agglomerates is conducted by using an apparatus provided with an agitating mechanism and a crushing mechanism.

According to the above-mentioned process, however, it is necessarily required that the organic liquid having the surface tension of not more than 35 dynes/cm is used in an amount of 20% to 300% by weight based on the polytetrafluoroethylene primary particles, for improving the powder flowability. Such an organic liquid is expensive, so it is desirable that the liquid is not used if possible. Also, it tends to restrict the use of widely used fluorine-containing organic liquids such as trichlorotrifluoroethane all over the world, because it is said that the fluorine-containing organic liquid destroys the ozone layer.

An object of the present invention is to provide a process for preparing a polytetrafluoroethylene granular powder which is large in bulk density, is dense and is excellent in electric properties, without using any of the organic liquids as mentioned above.

This and other objects of the present invention will become apparent from the description hereinafter.

SUMMARY OF THE INVENTION

In accordance with the present invention, there is provided a process for preparing a polytetrafluoroethylene granular powder which comprises agitating primary particles of a finely divided polytetrafluoroethylene powder having an average particle size of not more than 100 μm in an aqueous medium containing no organic liquid to form agglomerates while crushing the agglomerates within a temperature range between not less than 20° C. and less than 60° C. in an apparatus having an agitating mechanism of the aqueous medium and a crushing mechanism of the agglomerates.

DETAILED DESCRIPTION

Figure 1:
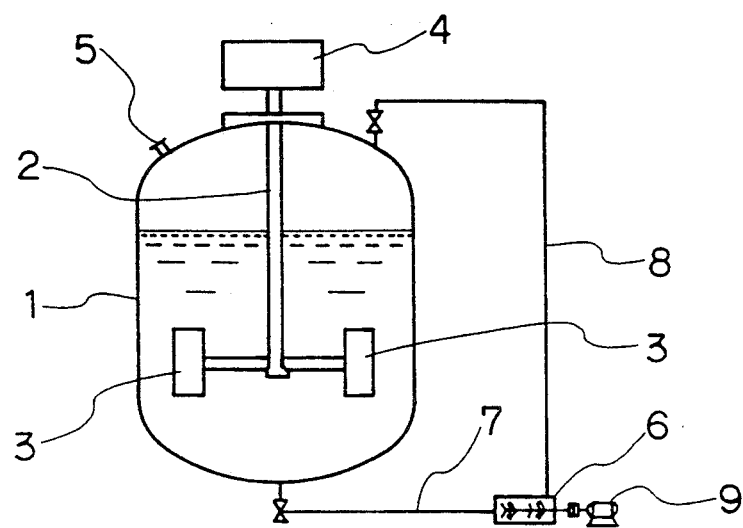
FIG. 1 is a schematic front view showing an apparatus used in the process of the present invention.

In the present invention, the primary particles, namely the finely divided particles of polytetrafluoroethylene suitably used as the starting material has an average particle size of not more than 100 μm, preferably not more than 50 μm. The primary particles of polytetrafluoroethylene are prepared by grinding a polymer powder which is obtained by polymerizing tetrafluoroethylene monomer in the presence of water containing a polymerization initiator, in the presence or absence of water by means of a grinder such as a hammer mill, a grinder equipped with a vaned rotor, a grinder of high energy fluid type or an impact grinder. Either a fibrous powder or a non-fibrous powder may be employed without any trouble.

As the aqueous medium, water is usually used. It is not always necessary to employ water purified in high purity. However, in case of employing water containing an inorganic or organic impurities, these impurities remain in the obtained polytetrafluoroethylene granular powder and, as a result, an article obtained from the granular powder is unfavorably made to color and the breakdown voltage is made to lower. Therefore, these impurities resulting in such disadvantages must be previously removed out of the aqueous medium.

The aqueous medium is suitably employed in the ratio of 150% to 5000% by weight to the primary particles of finely divided polytetrafluoroethylene, and the obtained slurry containing the primary particles is agitated to form agglomerates. An amount capable of giving the flowability to the slurry containing the polytetrafluoroethylene primary particles suffices for the used amount of the aqueous medium. The use of much amount of aqueous medium than the above-mentioned range brings to the economically disadvantage and on the other hand the lack of the aqueous med the procedures in agglomerating and in crushing difficult. So long as the slurry containing the polytetrafluoroethylene powder and the aqueous medium has a flowability, there is no problem in increase and decrease of the aqueous medium to some extent.

According to the process of the present invention, the agitating mechanism of the polytetrafluoroethylene powder in the aqueous medium and the crushing mechanism of the agglomerates are operated simultaneously. That is, the crushing is conducted at the same time as or after the agitation. Under such conditions, the agitation and the crushing are conducted within a temperature range between not less than 20° C. and less than 60° C. The temperature condition is very important. When the temperature is less than 20° C., there cannot be obtained the polytetrafluoroethylene granular powder having the high bulk density desired in the present invention. On the other hand, when the temperature is not less than 60° C., the electric properties of the obtained granular powder are influenced. Preferable temperature range is from 30° to 50° C., more preferable range is from 35° to 50° C. In general, the agitating and crushing can be conducted within the temperature range by maintaining the temperature of the aqueous medium to such a range (between not less than 20° C. and less than 60° C.). When the agglomeration is conducted under the above-mentioned conditions, there can be obtained the polytetrafluoroethylene granular powder having the desired particle size, having the uniform particle size distribution, being dense and having the excellent electric properties.

The term "crushing mechanism" used herein means a mechanism capable of lowering a particle size of a secondary agglomerate composed of primary particles by partially crushing an agglomerated powder having an improper large particle size or an abnormally large aggregate.

Figure 2:
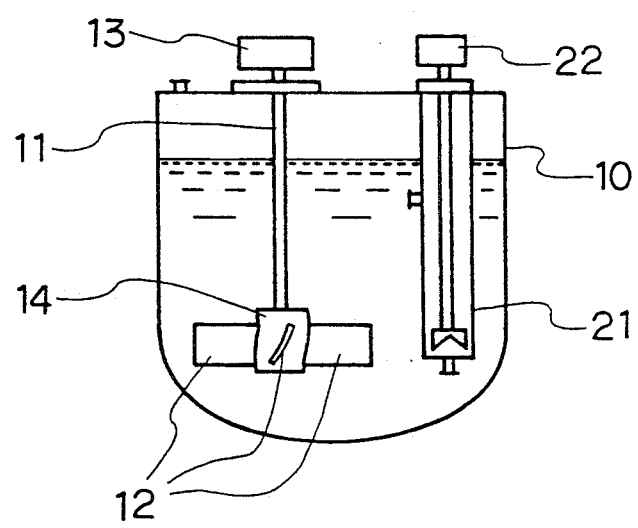
FIG. 2 is a schematic front view showing another apparatus used in the process of the present invention.

An apparatus employed in the instant process is explained by using figures. That is, each of FIG. 1 and FIG. 2 is the schematic front view of the apparatus. In FIG. 1, the numeral 1 is the agitating vessel, and in the agitating vessel 1 the rotor 2 is centered vertically. At the under end of the rotor 2 the agitating vane 3 is equipped radially, and the upper end of the rotor 2 is connected with the motor 4. The numeral 5 is the providing port for the aqueous medium, the numeral 6 is the crusher, and the numeral 9 is the motor. The crusher 6 is connected with the under region and the upper region of the agitating vessel 1 through the transfer pipes 7 and 8, respectively. As the crusher 6, there can be employed one making a crushing of the polytetrafluoroethylene particles included in the aqueous medium possible by means of rotating a cutter of turbine blade type in a cylinder with transferring the aqueous medium. Examples of such an apparatus are Pipe-line homomixer (trademark) (commercially available from Tokushukika Kogyo Kabushiki Kaisha) and Disintergrator (trademark) (commercially available from Komatsu Mfg. Co., Ltd.) which are equipped with a cutter and a stator being able to provide cutting and impact.

The aqueous medium including the primary particles of polytetrafluoroethylene is introduced in the agitating vessel 1 through the providing port 5, and then agitated by means of the agitating vane 3. At the same time as the agitation or after agitation, the aqueous medium is introduced to the crusher 6 through the transfer pipe 7. By passing through the crusher 6, agglomerates too large are crushed and the aqueous medium including the particles is returned to the agitating vessel 1 through the transfer pipe 8. Thus, an agglomerated powder having a uniform particle size can be obtained by carrying out the agglomeration by agitation in the agitating vessel 1 and the crushing of the largely agglomerated powder or the abnormally large aggregate in the crusher 6 at the same time or in order, or alternately.

FIG. 2 is the schematic front view showing another apparatus which can be employed in the present invention. In FIG. 2, the crusher 21 is set in parallel with the rotor 11 equipped with the agitating vane 12 in the agitating vessel 10. The numerals 13 and 22 are the motors for the rotor 11 and the crusher 21, respectively. The agitating vane 12 is radiately and spirally fixed on the boss 14 at the under end of the rotor 11. Therefore, in this case, the polytetrafluoroethylene particles included in the aqueous medium is agglomerated while the aqueous medium is agitated by the agitating vane 12 and the resultant agglomerated powder and aggregate are crushed by the crusher 21.

According to the present invention, it is preferable that the agitating vessel for agglomeration is charged with the primary particles of the finely divided polytetrafluoroethylene and water, and then the mixture is agitated while crushing. If circumstances require, the primary particles of polytetrafluoroethylene previously wetted by a small amount of water can be admixed with the residual aqueous medium in the agitating vessel and then agitated. Also the primary particles of polytetrafluoroethylene can be introduced in an agitating vessel previously charged with the aqueous medium and then agitated.

According to the present invention, the primary particles of polytetrafluoroethylene are agglomerated by the effect of agitation, and even if the granular powder having a particle size of more than 5000 $\mu$m is produced, such a large granular powder is crushed by utilizing a crusher at the same time as agitation or after agitation, or alternately with agitation, as stated above, to give a uniform granular powder of at most 600 $\mu$m in particle size.

Thus obtained polytetrafluoroethylene granular powder by the process of the present invention has the following properties.

Average particle size: 300 to 400 $\mu$m.
Bulk density: not less than 0.45 g/ml.
Breakdown voltage: not less than 8.0 KV.

An average particle size of the polytetrafluoroethylene granular powder is determined by a usual manner for measurement as follows: Standard sieves of 10, 20, 32, 48 and 60 mesh ("mesh" in the specification means "inch mesh") are superposed in order from the top, and the powder is placed in the 10 mesh sieve. The sieves are shaken to make the fine powder fall in order through them, and the ratios of the powder remained on each sieve are calculated by percentage by weight. On a log probability paper, thus obtained cumulative weight percentage figures are plotted on axis of ordinate against sieve-opening size on axis of abscissa, and these points are connected by a straight line. An average particle size is the value corresponding to cumulative percentages of 50.

A bulk density of the polytetrafluoroethylene granular powder is determined according to Japanese Industrial Standards (JIS) K 6891.

A breakdown voltage of the polytetrafluoroethylene granular powder is determined according to JIS K 6891.

The present invention is more specifically described and explained by means of the following Examples and Comparative Examples, in which all % and parts are by weight unless otherwise noted. It is to be understood that the present invention is not limited to the Examples, and various changes and modifications may be made in the invention without departing from the spirit and scope thereof.

EXAMPLE 1

A finely divided polytetrafluoroethylene was agglomerated by employing an apparatus as shown in FIG. 1.

A tank having an inner diameter of 1500 mm and a height of 2000 mm, which was equipped with an arrow-shaped agitating vane (as employed in turbine) having a maximum diameter of 600 mm and connected with Pipeline homomixer (a crusher commercially available from Tokushukika Kogyo Kabushiki Kaisha), was charged with 1000 liters of warm water having a temperature of 40° C. and 300 kg of primary particles of finely divided polytetrafluoroethylene having an average particle size of 29 μm (whose particle size distribution is shown in Table 1) and a bulk density of 0.28 g/ml. The vane was rotated at a speed of 98 r.p.m., while maintaining the inner temperature of the tank at 40° C., and, at the same time, the slurry in the tank was circulated through the crusher at the ratio of 500 liters/minute. This operation was continued for 10 minutes. For further 3 minutes, the agitation was continued. Then, the polytetrafluoroethylene powder was separated from water and dried to give a polytetrafluoroethylene granular powder having a uniform particle size distribution as shown in Table 1.

An average particle size was calculated from a log probability paper on which the results of the particle size distribution as shown in Table 1 were plotted, and it was confirmed that the granular powder had an average particle size of 330.8 μm. Also, the granular powder had a breakdown voltage of 9.5 KV.

Other properties of the granular powder are shown in Table 2 together with the properties of the primary particles.

EXAMPLE 2

The same procedure as in Example 1 was repeated except that primary particles of polytetrafluoroethylene having an average particle size of 50 μm and a bulk density of 0.33 g/ml were used. The treated polytetrafluoroethylene granular powder was separated from water and dried.

The obtained polytetrafluoroethylene granular powder had a particle size distribution as shown in Table 1.

The obtained granular powder had an average particle size calculated from the particle size distribution shown in Table 1 of 383 μm, and a breakdown voltage of 8.5 KV. The properties of the granular powder are shown in Table 2 together with those of the primary particles.

EXAMPLE 3

The same procedure as in Example 1 was repeated except that the inner temperature of the tank was 20° C. The treated polytetrafluoroethylene powder was separated from water and dried.

The obtained polytetrafluoroethylene granular powder had a particle size distribution as shown in Table 1.

The obtained granular powder had an average particle size calculated from the particle size distribution shown in Table 1 of 305 μm, and a breakdown voltage of 10.5 KV. The properties of the granular powder are shown in Table 2 together with those of the primary particles.

COMPARATIVE EXAMPLE 1

The same procedure as in Example 1 was repeated except that Pipeline homomixer was not used.

The obtained polytetrafluoroethylene granular powder had many large particles and a particle size distribution as shown in Table 1.

Also, it was difficult to form into a molded article from the obtained granular powder and the surface of the molded article was very uneven so if it was desired to use the article, the cutting was required.

The obtained granular powder had an average particle size calculated from the particle size distribution as shown in Table 1 of 1105 μm. The properties of the granular powder are shown in Table 2 together with those of the primary particles.

COMPARATIVE EXAMPLE 2

The same procedure as in Example 1 was repeated except that the agitation and crushing were conducted at a temperature of 90° C. The treated polytetrafluoroethylene powder was separated from water and dried.

The obtained polytetrafluoroethylene granular powder had a particle size distribution as shown in Table 1.

The obtained granular powder had an average particle size calculated from the particle size distribution as shown in Table 1 of 578 μm, and a low breakdown voltage of 4.5 KV. The properties of the granular powder are shown in Table 2 together with those of the primary particles.

TABLE 1

| | | Particle size Sieve size (mesh) | | | | | |
|---|---|---|---|---|---|---|---|
| | | 10 | 20 | 32 | 48 | 60 | pass 60 |
| | | Sieve openings (μm) | | | | | |
| | | 1651 | 833 | 495 | 295 | 246 | 246 |
| Ex. 1 | Proportions in the granules (%) | 1.5 | 3.8 | 15.6 | 37.9 | 15.2 | 26 |
| Ex. 2 | Proportions in the granules (%) | 1.9 | 1.9 | 17.3 | 48.5 | 17.3 | 13.1 |
| Ex. 3 | Proportions in the granules (%) | 0.2 | 1.5 | 8.3 | 38.5 | 32.2 | 19.3 |
| Com. Ex. 1 | Proportions in the granules (%) | 36.5 | 26.4 | 12.3 | 11.4 | 3.4 | 9.4 |
| Com. Ex. 1 | Proportions in the granules (%) | 1.6 | 20.5 | 30.8 | 38.9 | 6.0 | 2.2 |

TABLE 2

| | Polytetrafluoroethylene | Average particle size (μm) | Bulk density (g/ml) | Breakdown voltage (KV) |
|---|---|---|---|---|
| Ex. 1 | Primary particles | 29 | 0.28 | 14 |
| | Granules | 330.8 | 0.52 | 9.5 |
| Ex. 2 | Primary particles | 50 | 0.33 | 11 |
| | Granules | 383 | 0.50 | 8.5 |
| Ex. 3 | Primary particles | 29 | 0.28 | 14 |
| | Granules | 305 | 0.48 | 10.5 |
| Com. Ex. 1 | Primary particles | 29 | 0.28 | 14 |
| | Granules | 1270 | 0.52 | 8.0 |
| Com. Ex. 2 | Primary particles | 29 | 0.28 | 14 |
| | Granules | 578 | 0.75 | 4.5 |

TEST EXAMPLE

Each of the polytetrafluoroethylene granular powders obtained in Examples 1-3 and Comparative Examples 1 and 2 was molded into a sheet and the surface roughness of the sheet was measured as follows:

Test method: A mold having a concave portion with a diameter of 100 mm is charged with 65 g of the polytetrafluoroethylene granular powder and it is preformed under a pressure of 300 kg/cm$^2$ to give a preformed sheet. The obtained sheet is sintered at a temperature of 370° C. in an electric furnace for 5.5 hours, then the temperature is dropped down to room temperature at a cooling rate of 5.5° C./hour to give a molded article. The measurement is carried out by employing a roughness tester SE-4 commercially available from Kabushiki Kaisha Kosaka Kenkyusho. The surface roughness is expressed by the value of the obtained central average roughness provided by JIS B 0601.

The results are shown in Table 3.

TABLE 3

| Ex. No. | Surface roughness (μm) |
|---------|------------------------|
| Ex. 1   | 1.8                    |
| Ex. 2   | 1.7                    |
| Ex. 3   | 1.6                    |
| Com. Ex. 1 | 2.5                 |
| Com. Ex. 2 | 2.8                 |

The preparation process of the present invention can provide the dense polytetrafluoroethylene granular powder having the excellent electric properties and high bulk density, without using the organic liquid which is expensive and whose use is restricted.

In addition to the ingredients used in the examples, other ingredients can be used in the examples as set forth in the specification to obtain substantially the same results.

What we claim is:

1. A process for preparing a polytetrafluoroethylene granular powder which comprises:

agitating an aqueous dispersion of a finely divided polytetrafluoroethylene powder having an average particle size of not more than 100 μm to agglomerate the powder in the aqueous dispersion, said aqueous dispersion being at a temperature from 20° C. to less than 60° C. and containing no organic liquid; and crushing the agglomerated powder in the aqueous dispersion.

2. The process of claim 1, wherein the agglomerated powder in the aqueous dispersion is crushed simultaneously with agitation of the aqueous dispersion.

3. The process of claim 1 wherein the agglomerated powder in the aqueous dispersion is crushed after the aqueous dispersion has been agitated.

4. A process for preparing a polytetrafluoroethylene granular powder which comprises:

agitating an aqueous dispersion of a finely divided polytetrafluoroethylene powder having an average particle size of not more than 100 μm to agglomerate the powder in the aqueous dispersion, said aqueous dispersion being at a temperature from 20° C. to less than 60° C. and containing no organic liquid; crushing the agglomerated powder in the aqueous dispersion; and returning the dispersion containing the crushed agglomerated powder to the aqueous dispersion of the finely divided polytetrafluoroethylene powder undergoing agitation.

* * * * *